United States Patent
Zhu et al.

(10) Patent No.: US 10,208,237 B2
(45) Date of Patent: Feb. 19, 2019

(54) METHOD FOR TUNING THE THERMAL CONDUCTIVITY OF A NANOLAYERED MATERIAL AND THERMAL INSULATORS PREPARED THEREBY

(71) Applicant: Toyota Motor Engineering & Manufacturing North America, Inc., Erlanger, KY (US)

(72) Inventors: Gaohua Zhu, Ann Arbor, MI (US); Ruigang Zhang, Ann Arbor, MI (US); Debasish Banerjee, Ann Arbor, MI (US)

(73) Assignee: Toyota Motor Entineering & Manufactirung North America Inc., Plano, TX (US)

( * ) Notice: Subject to any disclaimer, the term of this patent is extended or adjusted under 35 U.S.C. 154(b) by 600 days.

(21) Appl. No.: 14/679,515

(22) Filed: Apr. 6, 2015

(65) Prior Publication Data

US 2016/0289524 A1 Oct. 6, 2016

(51) Int. Cl.
  *C09K 5/14* (2006.01)
  *C01G 39/06* (2006.01)
  *C25D 21/12* (2006.01)

(52) U.S. Cl.
  CPC ............... *C09K 5/14* (2013.01); *C01G 39/06* (2013.01); *C25D 21/12* (2013.01); *C01P 2002/50* (2013.01); *C01P 2002/82* (2013.01); *C01P 2004/03* (2013.01); *C01P 2004/04* (2013.01); *C01P 2004/24* (2013.01); *C01P 2006/32* (2013.01)

(58) Field of Classification Search
  CPC .......... C09K 5/14; C25D 21/12; C01G 39/06; C01P 2004/24; C01P 2004/03; C01P 2004/04; C01P 2002/82; C01P 2002/50; C01P 2006/32
  See application file for complete search history.

(56) References Cited

PUBLICATIONS

Wang et al.; "Physical and chemical tuning of two-dimensional transition metal dichalcogenides"; Royal Society of Chemistry; Aug. 28, 2014; in 17 pages.*

Cho, J.m Losego, M.D., Zhang, H.G., Kim, H., Zuo, J., Petrov, I., Cahill, D.G., Braun, P.V., "Electrochemically tunable thermal conductivity of lithium cobalt oxide", Nature Communications, 5, Published May 5, 2014, doi:10.1038/ncomms5035.*

Wand et al, "Electrochemical tuning of vertically aligned MoS2 nanofilms and its application in improving hydrogen evolution reaction" PNAS, Dec. 3, 2013, vol. 110, No. 49, 19701-19706, (Year: 2013).*

(Continued)

*Primary Examiner* — Louis J Rufo
(74) *Attorney, Agent, or Firm* — Christopher G. Darrow; Darrow Mustafa PC

(57) ABSTRACT

A method for tuning the thermal conductivity of a nanolayered material is presented. The method includes a step of intercalating the nanolayered material with cations, based on a correlation between cation loading density and thermal conductivity. A bond coat of a thermal barrier system is also disclosed. The bond coat includes a nanolayered material intercalated with cations at a specified loading density based on a correlation between cation loading density and thermal conductivity.

8 Claims, 7 Drawing Sheets

(56) References Cited

PUBLICATIONS

Wang et al.; "Electrochemical tuning of vertically aligned MoS2 nanofilms and its application in improving hydrogen evolution reaction"; PNAS; Oct. 30, 2013; in 6 pages.
Cho et al.; "Electrochemically tunable thermal conductivity of lithium cobalt oxide"; Nature Communications Abstract; Jun. 3, 2014; in 5 pages.
Holgate et al.; "Thermoelectric Properties of Li-Intercalated ZrSe2 Single Crystals"; Journal of Electronic Materials, vol. 42, No. 7; 2013; in 5 pages.

* cited by examiner

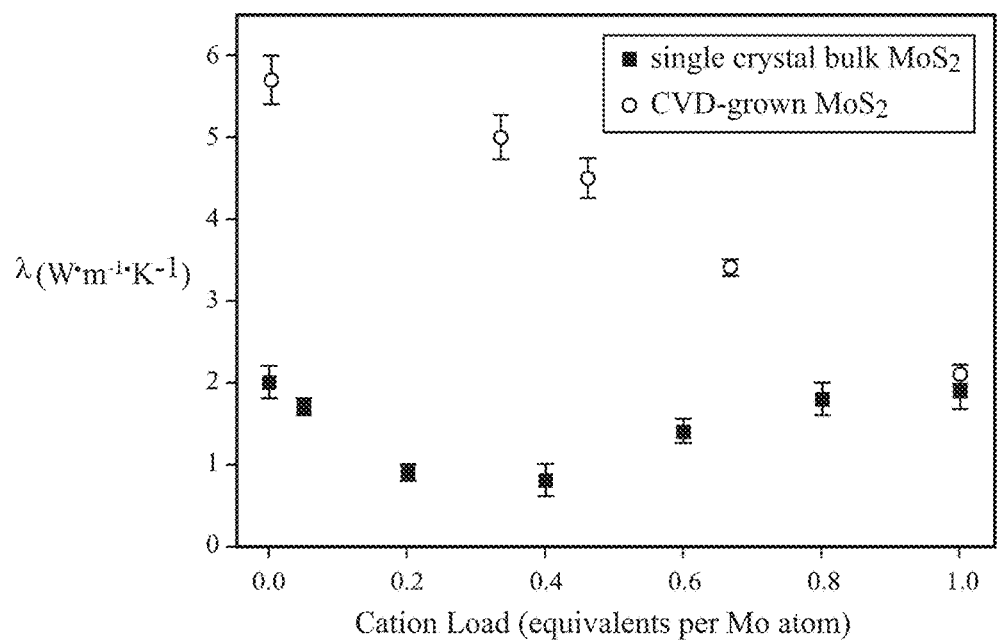
FIG. 6
FIG. 7
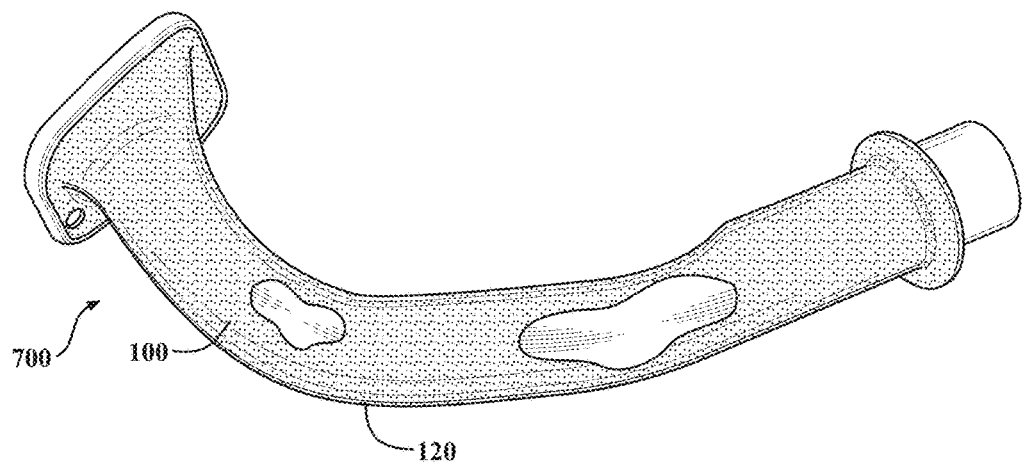

METHOD FOR TUNING THE THERMAL CONDUCTIVITY OF A NANOLAYERED MATERIAL AND THERMAL INSULATORS PREPARED THEREBY

TECHNICAL FIELD

The present disclosure relates to a method of producing a material having a desired thermal conductivity and a thermal barrier that includes cation-intercalated nanolayered material.

BACKGROUND

A thermal barrier can be a material positioned to prevent the transfer of heat across a temperature gradient. In some instances, a thermal barrier can include a coating applied to the surface of a substrate to minimize the migration of heat into, or out of, the substrate. In different uses, thermal barriers can include solids, such as organic polymers or inorganic oxides or other ceramics, liquids, gases, or combinations thereof.

A thermal barrier's ability to minimize heat transfer is generally a function of the material's thermal conductivity: the lower the thermal conductivity, the greater the extent to which heat transfer will be minimized. Thermal conductivity is generally a function of the composition and structure of the material and, in many instances, there is no easy way to modify, or tune, the thermal conductivity of a given thermal barrier material, to suit the needs of a particular application.

Nanolayered materials generally are materials that naturally adopt a structure having stacks of two-dimensional crystallites: sheets of the material that can be macroscopic in length and/or width, but have thickness in the low nanometer scale. Such materials have been used as solid lubricants, as electrode materials, and for a number of other electrical or optical uses. It has been shown that electrochemical and other properties of nanolayered materials can be adjusted by intercalation with small molecules or ions.

SUMMARY

The present disclosure provides a method for tuning the thermal conductivity of a nanolayered material. The present disclosure also provides tunable thermal barriers for the surface of a component.

In various aspects, the methods for tuning the thermal conductivity of a nanolayered material can include a step of measuring a thermal conductivity for each of a plurality of reference samples, each sample of the plurality including nanolayered material intercalated with molecules, ions, or a combination thereof at a specified loading density. The method can also include a step of determining a correlation between the thermal conductivity and the loading density. The method can further include selecting a specified loading density based on the correlation to yield a desired thermal conductivity of the nanolayered material. The method can further include intercalating molecules, ions, or a combination thereof into the nanolayered material at the specified loading density, thereby adjusting the thermal conductivity of the nanolayered material.

The tunable thermal barrier can include a nanolayered material intercalated with cation at a specified loading density that is based on a measured correlation between (i) a thermal conductivity of a cation-intercalated nanolayered material, and (ii) a loading density of intercalated cations.

BRIEF DESCRIPTION OF THE DRAWINGS

Various aspects and advantages of the disclosure will become apparent and more readily appreciated from the following description of the various aspects taken in conjunction with the accompanying drawings, of which:

FIG. 6 is a data plot of thermal conductivity vs. cation loading density for two types of nanolayered material;

FIG. 7 is a perspective view of a part coated with a thermal barrier that includes a cation-intercalated nanolayered material;

DETAILED DESCRIPTION

Figure 1A:
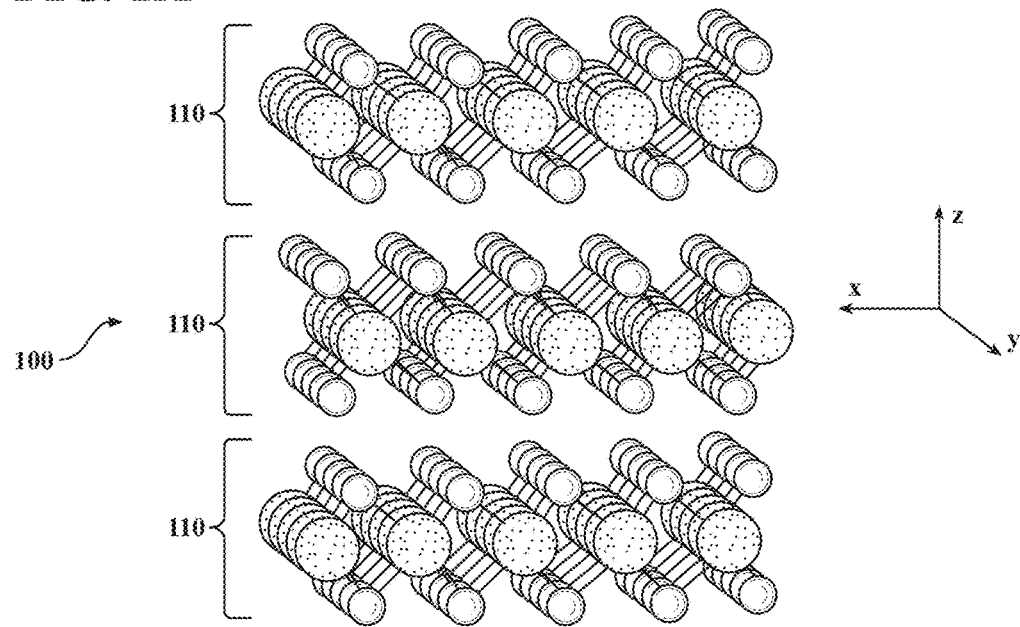
FIG. 1A is a schematic perspective view of a nanolayered material of the present disclosure, shown at angstrom scale.

The present disclosure provides tunable thermal barriers and methods useful for tuning the thermal conductivity of a nanolayered material. Thermal conductivity of a nanolayered material according to the present disclosure can be adjusted across a significant range, and down to low levels.

A disclosed thermal barrier includes a nanolayered material optionally having cations intercalated between the nanolayers. The method includes intercalating a nanolayered material with cations, preferably by cathodization of the nanolayered material. The intercalating cations modulate thermal conductivity of the nanolayered material, thus the thermal conductivity of the composition can be adjusted or tuned by controlling the relative quantity of intercalating cations. It is to be appreciated that, while the present disclosure may specifically describe nanolayered materials intercalated with cations, or methods for tuning the thermal conductivity of a nanolayered material that include intercalating the nanolayered material with cations, such intercalation can equally be performed with neutral molecules, with ions generally (including anions), or a combination thereof.

As used herein, the phrase "nanolayered material" refers to a material having a molecular structure comprising layered, two-dimensional crystallites. Each two-dimensional crystallite is characterized by dimensions of length, width, and thickness, and occupies an approximately planar space that is the product of the crystallite's length and width. Typically the length and the width of a two-dimensional crystallite will be on the order of several tens to several thousands of nanometers while the thickness will typically be on the order of several nanometers. It will be understood that individual two-dimensional crystallites can often deviate from true planarity, such as by curvature, over distances of length and/or width greater than several tens of nanometers. Near planarity will typically be observed over distances of length and width of up to several tens of nanometers.

Suitable, non-limiting examples of nanolayered materials include graphite, graphene, metal or metalloid nitrides, and transition metal dichalcogenides having the formula $MX_2$, where M is a transition metal and X is any of sulfur, selenium, and tellurium. A transition metal is any D-block element of periods 3-12. In some implementations, a transition metal dichalcogenide can be a transition metal sulfide, and in some particular implementations is molybdenum sulfide ($MoS_2$).

A nanolayered material will typically comprise a plurality of two-dimensional crystallites, with adjacent two-dimensional crystallites typically parallel and having roughly identical deviations from planarity over distances of length and/or width greater than several tens of nanometers. Adjacent two-dimensional crystallites are typically maintained in a layered configuration relative to one another, substantially by van der Waals forces between opposing, facing plane surfaces.

Cations, other atoms, or small molecules can occupy sites between adjacent two-dimensional crystallites. Such site occupation, referred to herein as "intercalation", can change the nature of interactions between adjacent two-dimensional crystallites, for example from predominantly van der Waals to substantially ionic, dative, or other.

Figure 1B:
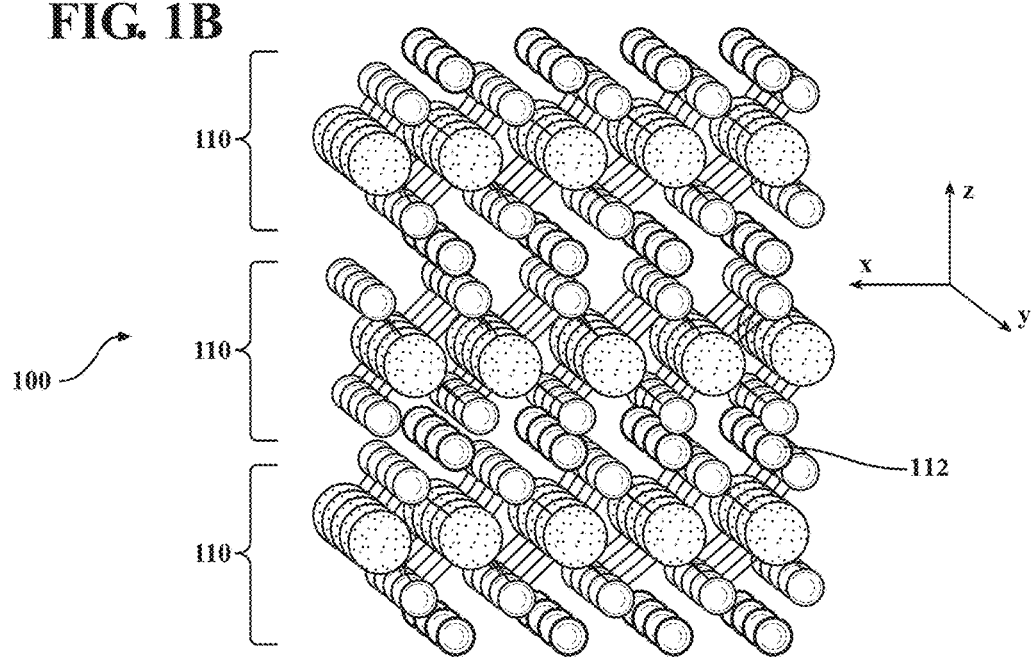
FIG. 1B is a schematic perspective view of a cation-intercalated, nanolayered material of the present disclosure, shown from the perspective and at the scale of FIG. 1A.

FIG. 1A shows an approximately one $nm^3$ portion of a nanolayered material 100 of the transition metal dichalcogenide variety. The nanolayered material 100 comprises a plurality of two-dimensional crystallites 110, alternatively referred to herein as "nanolayers". FIG. 1B shows a nanolayered material 100 of FIG. 1A that is intercalated with cations 112. It will be appreciated that while the example of FIG. 1B shows approximately 100% cation loading, in which all available cation occupancy sites are occupied (in this example, an approximately 1:1 stoichiometric ratio of cations to transition metal atoms), lower cation loading percentages can, and often will, be employed. The nanolayered material 100 can be intercalated with cations at any cation loading density from 1 to 100%, inclusive. As noted above, the nanolayered material can alternatively or additionally be intercalated with neutral molecules or anions. In instances where neutral molecules are used, they will typically be of a relatively small size that enables them to fit into intercalation sites. In some variations where intercalating cations are used, the intercalating cations can be alkali metal cations or alkaline earth metal cations. In some specific implementations, the intercalating cations can be lithium cations.

Figure 2A:
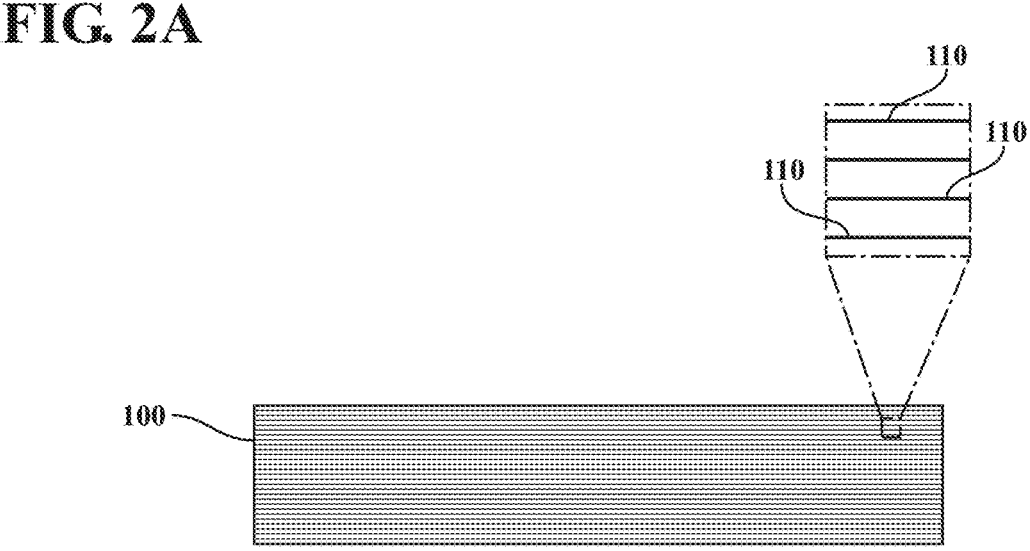
FIG. 2A is a schematic side view of a parallel-plane nanolayered material contacting a substrate.
Figure 2B:
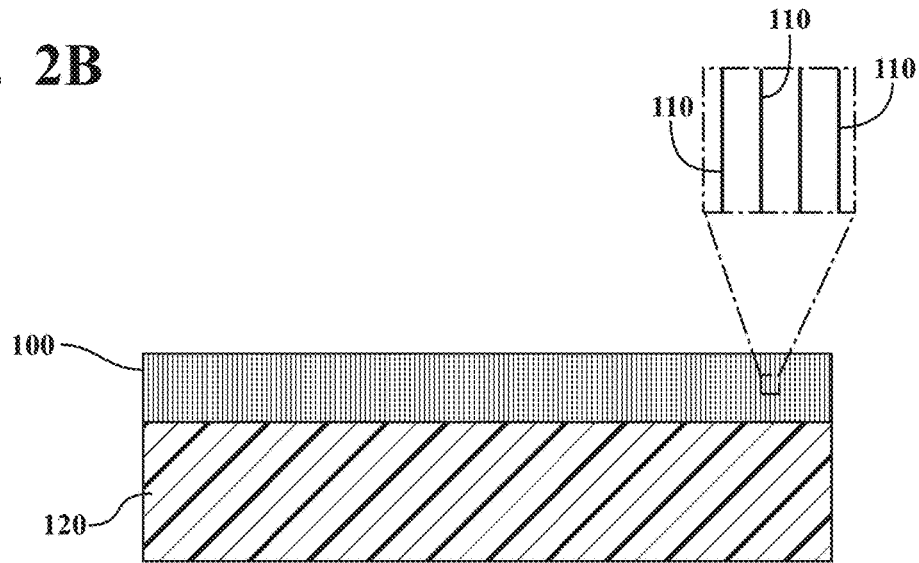
FIG. 2B is a schematic side view of an orthogonal-plane nanolayered material contacting a substrate.

While the two-dimensional crystallites 110 of a nanolayered material 100 can be oriented in any direction, FIGS. 2A and 2B show two particular orientations: a substantially parallel-plane orientation (FIG. 2A) and a substantially orthogonal-plane orientation (FIG. 2B). In general, parallelism or orthogonality of the two-dimensional crystallites of a nanolayered material can be defined, at least, in any of the following ways: (i) relative to a surface of a contacted substrate 120, (ii) relative to a maximum linear dimension of the nanolayered material 100, and (iii) relative to a temperature gradient vector of interest. A nanolayered material 100 in which the two-dimensional crystallites 110 have parallel-plane orientation can be referred to as a parallel-plane nanomaterial, and a nanolayered material 100 in which the two-dimensional crystallites 110 have orthogonal-plane orientation can be referred to as an orthogonal-plane nanomaterial.

Figure 2C:
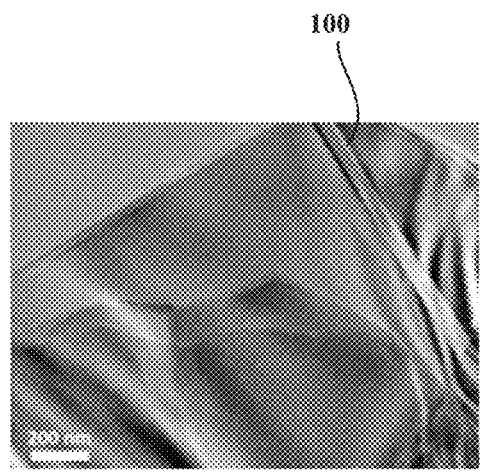
FIG. 2C is a top-view electron micrograph of the nanolayered material of FIG. 2B.
Figure 2D:
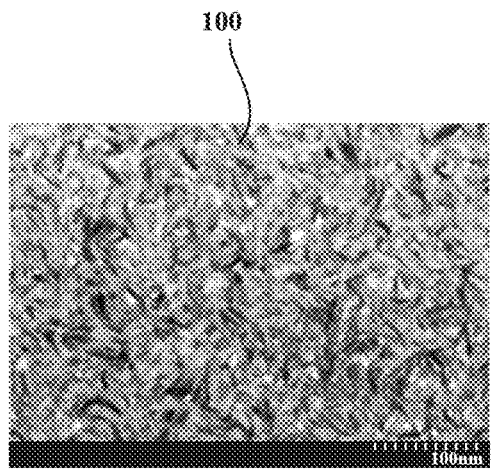
FIG. 2D is a top-view electron micrograph of the nanolayered material of FIG. 2A.
Figure 2E:
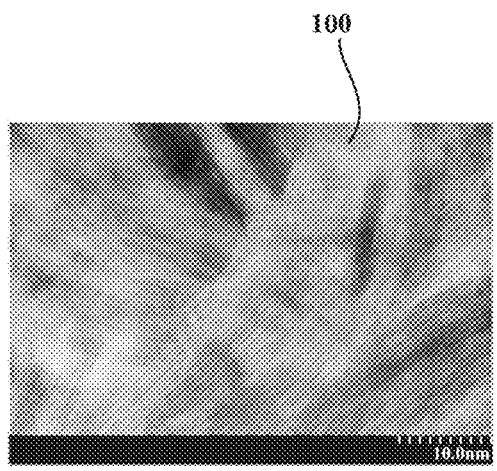
FIG. 2E is a top-view electron micrograph of the nanolayered material of FIG. 2A at ten-fold greater magnification as compared to the view of FIG. 2D.
Figure 2F:
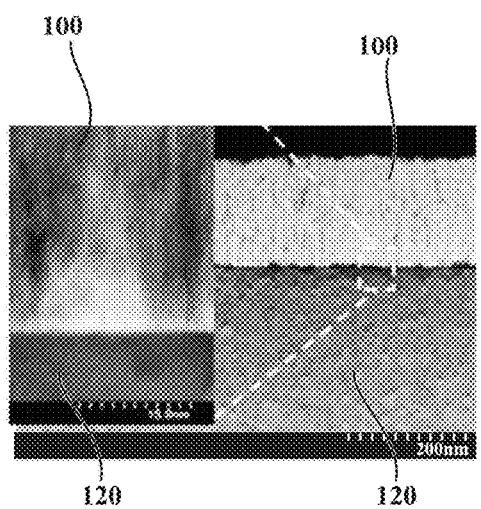
FIG. 2F is a side cross sectional view electron micrograph of the nanolayered material of FIG. 2B.

Electron micrographs of exemplary parallel-plane and orthogonal-plane nanolayered materials are shown in FIGS. 2C-2F. FIG. 2C shows an overhead view of a bulk $MoS_2$ crystal at ~50000× magnification, definable as a plane parallel nanolayered material at least according to criterion (ii) above (two-dimensional crystallites 110 are substantially parallel to a maximum linear dimension of the material). FIGS. 2D and 2E show overhead views, at ~20000× and 200000× magnification, respectively, of an $MoS_2$ film formed on a sapphire substrate by chemical vapor deposition (CVD). FIG. 2F shows a cross-sectional side view, at ~10000× (inset at ~130000×), of the material of FIGS. 2D and 2E, showing that the two-dimensional crystallites are orthogonal to both the contacted surface of the substrate and to the maximum linear dimension of the material, and therefore that the CVD-deposited material in this case is an orthogonal-plane material.

Figure 3:
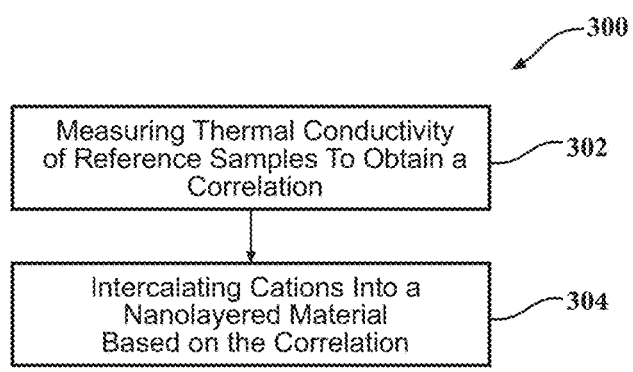
FIG. 3 is a simplified flow chart of a method for tuning the thermal conductivity of a nanolayered material.

Referring now to FIG. 3, a method 300 for tuning the thermal conductivity of a nanolayered material is disclosed. The method 300 includes a step 304 of intercalating cations into the nanolayered material at a specified loading density, the specified loading density based on a correlation between (i) a thermal conductivity of a cation-intercalated nanolayered material and (ii) a loading density of intercalated cations. In some variations, the nanolayered material of step 304 will be either a parallel-plane nanolayered material or an orthogonal-plane nanolayered material.

Figure 4:
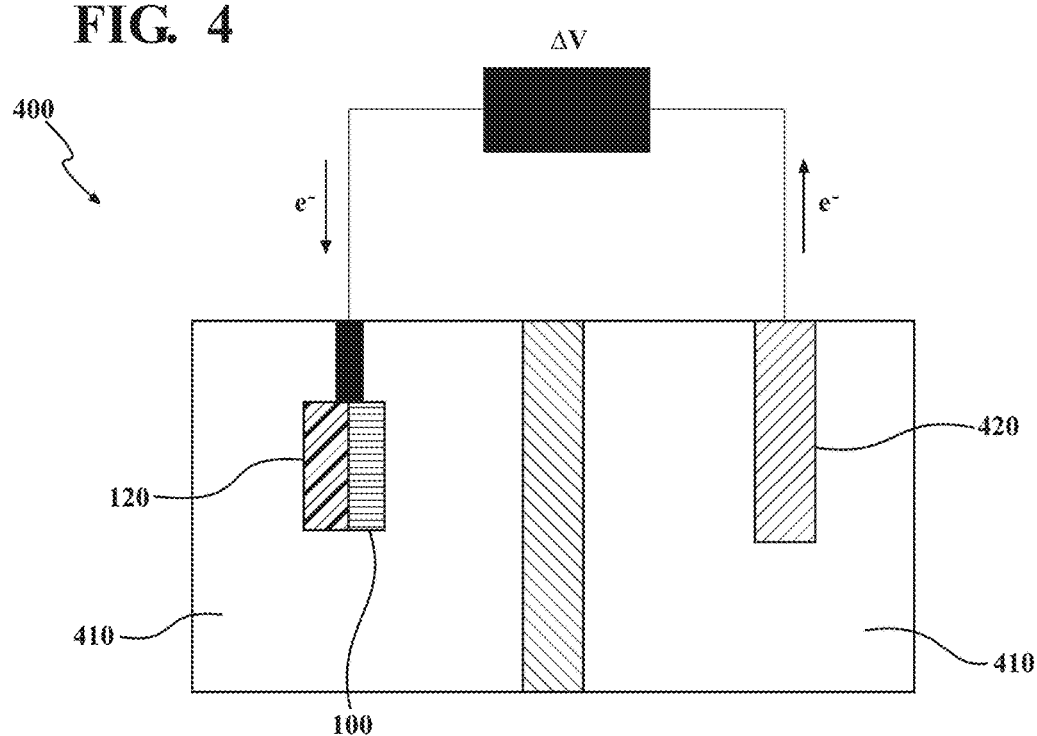
FIG. 4 is a schematic view of an electrochemical device for cathodizing a nanolayered material.

The intercalating step 304 can be performed by a variety of techniques, including diffusion, electrochemical intercalation, a layer-by-layer electrochemical approach, and spin coating. In some particular variations, the intercalating step 304 can be performed by cathodizing the nanolayered material in an electrochemical cell. An example of such cathodizing is illustrated schematically via an electrochemical cell 400 in FIG. 4. As shown in FIG. 4, a nanolayered material 100, potentially contacting a substrate 120, is positioned in a cathodic half-cell in contact with an electrolyte 410. The electrolyte 410 contains the cation to be intercalated into the nanolayered material 100. The cathode chamber is placed in electrical communication with an anode chamber having an anode 420 in contact with the electrolyte 410. While the example of FIG. 4 shows the cathode and anode chambers having the same electrolyte, it will be appreciated that this need not necessarily be so. The anode 420 will typically include a material capable, upon oxidation, of producing cations of the type to be intercalated into the nanolayered material 100.

In the example of FIG. 4, it will be appreciated that application of an electrical potential, $\Delta V$, between the anode 420 and the cathode can cause cations present in the electrolyte 410, and obtainable from the anode 420, to intercalate into the nanolayered material 100. It will further be appreciated that the extent of cation intercalation can be controlled by modulating the duration of application of the electrical potential, the magnitude of the electrical potential applied, or both. This control of the extent of cation intercalation can make a cathodization procedure an especially favorable means of performing the intercalating step 304 to obtain a nanolayered material having a specified cation loading density based on the correlation between (i) a thermal conductivity of a cation-intercalated nanolayered material and (ii) a loading density of intercalated cations.

In some variations, the correlation used in the intercalating step 304 can be obtained by a step 302 of measuring thermal conductivities for a plurality of reference samples, each reference sample of the plurality comprising a cation-intercalated nanolayered material characterized by a specified cation loading density. In some variations, the plurality of reference samples can be produced by any procedure suitable for performing the intercalating step 304. It will typically be preferable, but not required, that each of the plurality of reference samples be prepared by the same technique with which the intercalating step 304 is performed. It will be appreciated however that the conditions used for preparation of each the plurality of reference samples, such as duration or magnitude of applied electrical potential in the case of cathodizing, will vary.

Figure 5A:
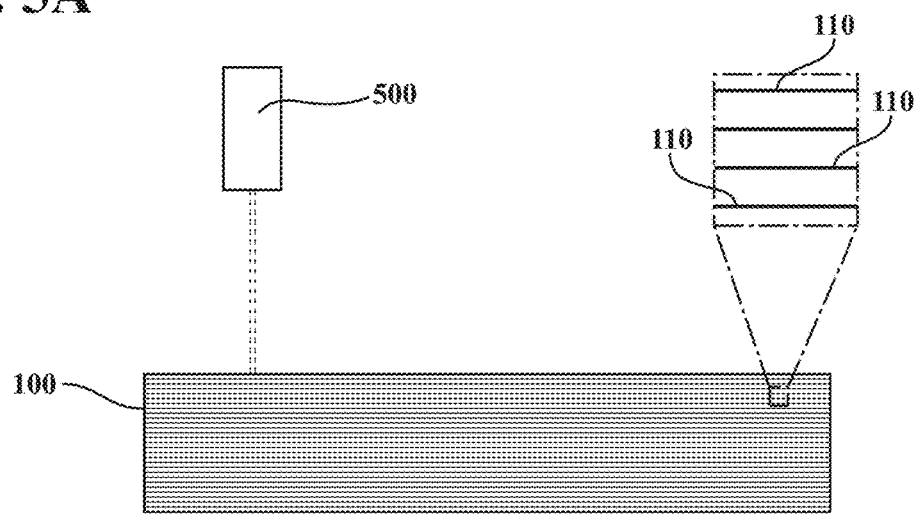
FIGS. 5A and 5B are schematic views of a setup for measuring the thermal conductivity of a parallel-plane (FIG. 5A) or an orthogonal-plane (FIG. 5B) nanolayered material, the measurement performed by time-domain thermoreflectance.
Figure 5B:
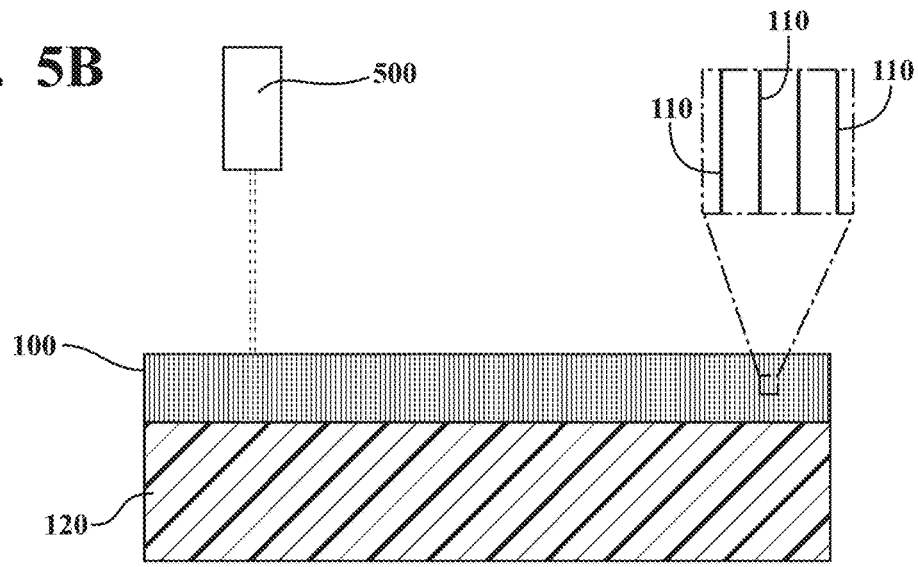

In variations where a measuring step 304A is employed, the measuring step 304A can be performed by any suitable approach, such as transient plane source, transient line source, laser flash, 3ω, time-domain thermoreflectance, as well as steady-state approaches. FIGS. 5A and 5B schematically illustrate a time-domain thermoreflectance setup for performing the measuring step 304A, where the nanolayered material 100 is a parallel-plane nanolayered material (FIG. 5A) or an orthogonal-plane nanolayered material (FIG. 5B). A time-domain thermoreflectance apparatus 500 thermally excites a surface of the nanolayered material 100 with a pulsed laser which generates reflecting acoustic waves. A probe laser associated with the apparatus 500 then detects changes in the reflected acoustic waves over time, the changes being indicative of heat dissipation at the excited site.

An example of a correlation utilized in the intercalating step 304, and/or obtained by the measuring step 304A, is shown in FIG. 6 as a graph of thermal conductivity vs. cation loading density. In the example of FIG. 6, the nanolayered material is $MoS_2$ (either parallel-plane or orthogonal-plane) and the cations are $Li^+$. The reference samples that include the orthogonal-plane nanolayered material are obtained in this example by chemical vapor deposition (such as the materials of FIGS. 2D-2F) and the reference samples that include the parallel-plane nanolayered material are bulk $MoS_2$ crystals (such as the material of FIG. 2C). Data points for the orthogonal-plane nanolayered material are shown as open circles, while those for the parallel-plane nanolayered material are shown as closed squares.

In the example of FIG. 6, a zero percent cation loading density corresponds to a nanolayered material that has no intercalated cation while a one-hundred percent cation loading density corresponds to a nanolayered material that has cation intercalated to capacity—in this case approximately a 1:1 ratio of lithium cations to molybdenum atoms. As can be seen from FIG. 6, the thermal conductivity of each material changes as a function of cation loading density, however, the correlation between thermal conductivity and cation loading density is different for the parallel-plane nanolayered material as compared to the orthogonal-plane nanolayered material. Specifically, thermal conductivity of the orthogonal-plane nanolayered material is at a maximum of nearly 6 $W \cdot m^{-1} \cdot K^{-1}$ when no cation is intercalated, and decreases fairly uniformly to a minimum of ~2 $W \cdot m^{-1} \cdot K^{-1}$ at 100% cation loading. Thus, there is a continuous negative correlation in this example between cation loading density and thermal conductivity. Without being bound by any particular theory, it is believed this may be due to phonon scattering by the intercalated cations.

The parallel-plane nanolayered material shows a different correlation pattern. First, the thermal conductivity is generally lower for the parallel-plane nanolayered material at all, or nearly all, cation loading densities. Second, instead of showing a continuous decrease in thermal conductivity with increasing cation loading density, the parallel-plane nanolayered material shows an initial decrease in thermal conductivity with increasing cation loading density—to a minimum of ~1 $W \cdot m^{-1} \cdot K^{-1}$ from twenty-to-forty percent cation loading—followed by an increase to the maximum of ~2 $W \cdot m^{-1} \cdot K^{-1}$ from forty to one hundred percent cation loading.

Thus, it can be seen that two factors can be used to tune the thermal conductivity of a nanolayered material according to the present disclosure: the orientation of two-dimensional crystallites within the nanolayered material (e.g. parallel or orthogonal), and the extent of cation loading achieved in the intercalating step 304.

It will be appreciated that the exact values of thermal conductivity, and even the trends of the correlation between thermal conductivity and cation loading density, can vary for a given nanolayered material depending on the approach used in the measuring step 304A. In particular, thermal conductivity is generally expected to be lower for heat transfer occurring in a direction perpendicular to two-dimensional crystallites 110 and higher for heat transfer occurring parallel to two-dimensional crystallites 110. The time-domain thermoreflectance approach used in this example generally measures heat transfer in all directions (parallel, perpendicular, and oblique) relative to the two-dimensional crystallites, but a technique which measured heat transfer in one direction would likely yield somewhat different results. If a particular direction of heat transfer is of greatest interest during use of a thermal insulator prepared by the present method 300, it may be preferable to use a correlation determined by a measuring step in which the approach for measuring thermal conductivity measures it against a temperature gradient having a direction the same as the direction of heat transfer to be insulated against.

Also disclosed is a thermal barrier system, the thermal barrier including a nanolayered material intercalated with cations. The cations will typically be intercalated at a specified loading density based on a correlation between thermal conductivity and cation loading density, as described above. The nanolayered material and cation intercalation are as described above with respect to the method 300. In some implementations, a bond coat can have a thermal conductivity less than 2 $W \cdot m^{-1} \cdot K^{-1}$ as measured by time-domain thermal reflectance and as shown in FIG. 6. In different implementations, the nanolayered material can be a plane parallel nanolayered material or an orthogonal nanolayered material. In some implementations, intercalating cations can be present at a loading density of 20-40%, and in some implementations, intercalating cations can be present at a loading density of >90%.

In some implementations, and as shown in FIG. 7, the nanolayered material 100 of the thermal barrier can in some instances be deployed as a bond coat applied to a surface of a part, and configured to minimize heat transfer from or to the part. FIG. 7 shows a part 700 having a thermally insulating bond coat according to the present disclosure. In some implementations, the part 700 can be a part of an automobile, typically one which is exposed to substantially elevated temperature during vehicle operation. Non-limiting examples can include an engine component, an exhaust system component such as the exemplary conduit of FIG. 7, and an electrochemical cell component. The part 700 has a surface, which is analogous to the surface of a substrate 120 as described above. The part 700 further includes a thermal barrier having a nanolayered material 100 contacting a part surface. The nanolayered material 100 can be intercalated with cations to tune its thermal conductivity, as described.

The present disclosure is further illustrated with respect to the following examples. It needs to be understood that these examples are provided to illustrate specific variations of the present disclosure and should not be construed as limiting the scope of the present disclosure.

Example 1 Preparation of Orthogonal-Plane and Parallel-Plane $MoS_2$

A pristine $MoS_2$ film is fabricated by a catalyst-free chemical vapor deposition (CVD) method. A schematic of the synthesis of $MoS_2$ is illustrated in FIG. 1. The sapphire substrate is first cleaned with solvents (acetone, IPA) using ultrasonic technology, and baked at 80° C. for 3 min. A thin layer of Mo (typical thickness 50-200 nm) is pre-deposited on the substrate by sputtering at a slow deposition rate of 0.57 A/sec in order to assure good smoothness of the thin film surfaces. The $MoS_2$ film is grown inside a single zone horizontal tube furnace (Lindberg/Blue M) with a 1" diameter quartz tube. The Mo deposited substrate is placed in the hot center zone of the tube furnace. Sulfur powder (99.99% Sigma Aldrich) is placed on the upstream cold zone of the tube furnace, where the actual temperatures are calibrated before the experiment. Optimized reaction temperatures are in the range of 650 to 850° C., depending on the thickness of $MoS_2$. Argon gas is used as the carrier gas and the flow rate is kept at 100 sccm. During the growth, the heat center of the furnace is quickly raised to reaction temperature of the set point in 15 min, and the sulfur precursor is kept in between 120-200° C. The furnace is held at reaction temperature for 20 minutes, followed by natural cool down. Electron micrographs of this material are shown in FIGS. 2D-2F.

Parallel-plane nanolayered material is obtained by mechanical exfoliation of a bulk $MoS_2$ single crystal (SPI Supplies). The thickness of each flake is a few micrometers, and an electron micrograph of an exemplary exfoliated flake is shown in FIG. 2C.

Example 2 Raman Spectroscopy of Nanolayered Materials of Example 1

Figure 8A:
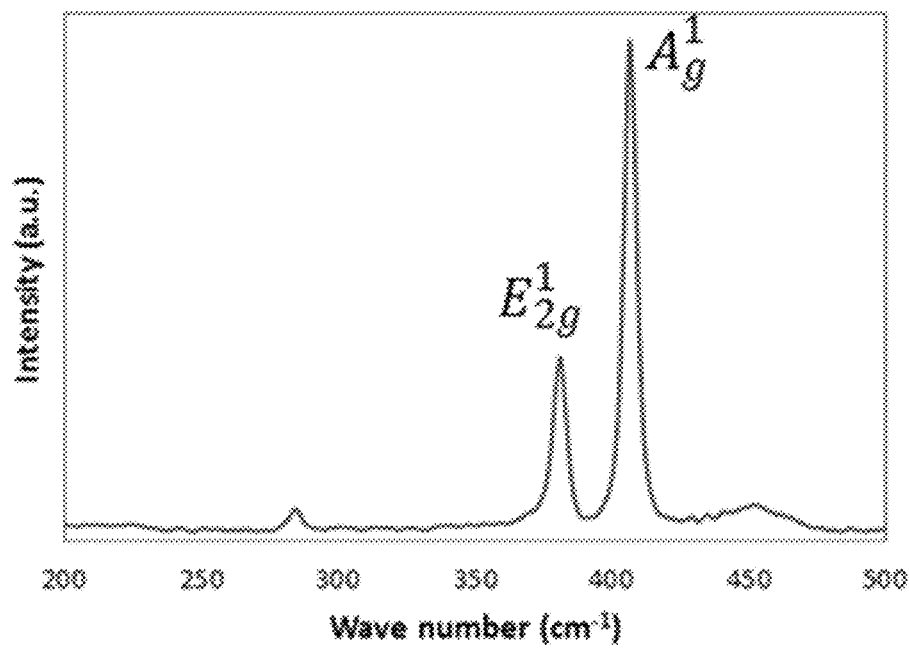
FIG. 8A is a Raman spectrum of an orthogonal-plane nanolayered material.

A Raman spectrum of the orthogonal-plane (CVD deposited) material of Example 1 is shown in FIG. 8A. Two peaks are observed at 381.3 $cm^{-1}$ and 406.4 $cm^{-1}$, respectively, for the in-plane Mo—S vibration mode ($E_{2g}^1$) and out-of-plane Mo—S vibration mode ($A_g^1$). The intensity of the $A_g^1$ mode is significantly higher than the $E_{2g}^1$ mode, which is consistent with TEM results, indicating that the out-of-plane mode is preferentially excited and the $MoS_2$ molecular layers of the thin film are vertically aligned with respect to the surface.

Figure 8B:
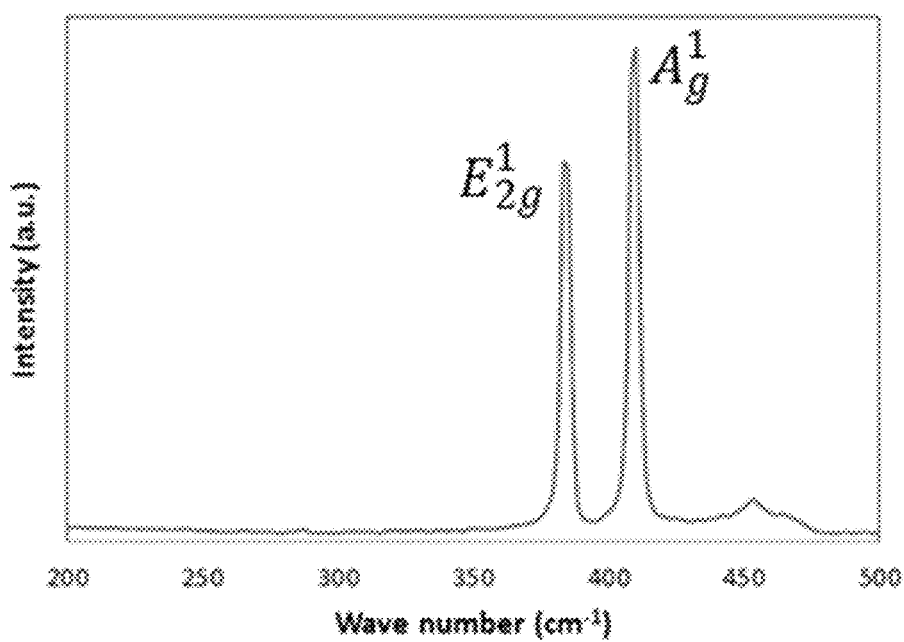
FIG. 8B is a Raman spectrum of a parallel-plane nanolayered material.

A Raman spectrum of the parallel-plane (mechanically exfoliated) material of Example 1 is shown in FIG. 8B. Parallel-plane nanolayered materials of Example 1 are mounted onto sapphire substrates with the basal plane parallel to the substrate for further characterization (e.g. electron microscopy and Raman spectroscopy). FIG. 8B shows the Raman spectrum of such a parallel-plane nanolayered material. Compared to the orthogonal-plane nanolayered material (FIG. 8A), the in-plane Mo—S mode ($E_{2g}^1$) of the parallel-plane material is preferentially excited and its intensity is close to that of the $A_g^1$ mode.

What is claimed is:

1. A method for tuning a thermal conductivity of a nanolayered material, the method comprising:
   measuring a thermal conductivity for each of a plurality of reference samples, each sample of the plurality of reference samples comprising a nanolayered material intercalated with molecules, ions, or a combination thereof at a specified loading density;
   determining a correlation between the thermal conductivity and the loading density; and
   intercalating molecules, ions, or a combination thereof into the nanolayered material at a desired loading density based on the correlation, thereby adjusting the thermal conductivity of the nanolayered material,
   wherein intercalating the nanolayered material comprises one of cathodizing the nanolayered material in an electrochemical cell, and intercalating by diffusion; and wherein the nanolayered material comprises a plurality of nanolayers arranged in a parallel orientation with respect to a surface of a substrate.

2. The method as recited in claim 1, wherein cathodizing the nanolayered material in an electrochemical cell further comprises:
   choosing a selected electrical potential and a selected duration to achieve a particular thermal conductivity based on the correlation; and
   controlling an amount of intercalation by cathodizing the nanolayered material at the selected electrical potential and for the selected duration.

3. The method as recited in claim 1, wherein the nanolayered material comprises a transition metal dichalcogenide.

4. The method as recited in claim 1, wherein the nanolayered material comprises molybdenum sulfide ($MoS_2$).

5. The method as recited in claim 1, comprising intercalating alkali metal cations, alkaline earth metal cations, or a combination thereof, into the nanolayered material.

6. The method as recited in claim 1, comprising intercalating lithium cations into the nanolayered material.

7. The method as recited in claim 1, comprising:
   intercalating a plurality of samples of the nanolayered material with molecules, ions, or a combination thereof, each at a different desired loading density, to produce a plurality of reference samples.

8. A method for tuning a thermal conductivity of a transition metal dichalcogenide, the method comprising:
   measuring a thermal conductivity for each of a plurality of reference samples, each sample of the plurality of reference samples comprising a transition metal dichalcogenide intercalated with alkali metal cations, alkaline earth metal cations, or a combination thereof at a specified loading density;
   determining a correlation between the thermal conductivity and the loading density; and
   intercalating alkali metal cations, alkaline earth metal cations, or a combination thereof into the transition metal dichalcogenide at a desired loading density based on the correlation, thereby adjusting the thermal conductivity of the nanolayered material, wherein intercalating the nanolayered material comprises one of: cathodizing the nanolayered material in an electrochemical cell, and intercalating by diffusion.

* * * * *